United States Patent [19]

Finnern

[11] Patent Number: 5,044,086
[45] Date of Patent: Sep. 3, 1991

[54] DRUM SCREW WITH MEASURING DRUM FOR A SEXTANT

[75] Inventor: Gerd Finnern, Hamburg, Fed. Rep. of Germany

[73] Assignee: C. Plath, Hamburg, Fed. Rep. of Germany

[21] Appl. No.: 653,860

[22] Filed: Feb. 8, 1991

Related U.S. Application Data

[63] Continuation of Ser. No. 300,611, Jan. 23, 1989, abandoned.

[30] Foreign Application Priority Data

Jan. 20, 1989 [DE] Fed. Rep. of Germany ....... 8800635

[51] Int. Cl.⁵ ................................................ G01C 1/08
[52] U.S. Cl. .................................................... 33/282
[58] Field of Search ................................ 33/281–285, 33/290, 292, 816; 356/247

[56] References Cited

U.S. PATENT DOCUMENTS

| 2,439,102 | 4/1948 | Rothweiler | 33/282 X |
| 3,484,942 | 12/1969 | Toubhans | 33/816 |
| 3,698,090 | 10/1972 | Parone | 33/816 |
| 4,656,878 | 4/1987 | Inai et al. | 33/299 X |

FOREIGN PATENT DOCUMENTS

| 3130702 | 2/1983 | Fed. Rep. of Germany | 33/267 |
| 418720 | 3/1947 | Italy | 33/268 |
| 556034 | 9/1943 | United Kingdom | 33/268 |

Primary Examiner—Harry N. Haroian
Attorney, Agent, or Firm—Elliott N. Kramsky

[57] ABSTRACT

A spring element, surrounding the drum-screw axis, is fitted between an annular shoulder on the bearing bush of a drum screw and the measuring drum. The spring element, preferably an annular spring assembly, produces a defined contact-bearing force of the drum screw against the bearing bush while at the same time making low-friction adjustment without axial backlash possible for the drum screw.

3 Claims, 1 Drawing Sheet

DRUM SCREW WITH MEASURING DRUM FOR A SEXTANT

This is a continuation of U.S. application Ser. No. 300,611 filed 1/23/89 now abandoned.

BACKGROUND

1. Field of the Invention

The present invention relates to sextants. More particularly, this invention pertains to a drum screw, having a measuring drum mounted on the extended drum-screw axis, for fine adjustment of the engagement of the drum screw into the limbus toothing on the sextant's limbus body.

2. Description of the Prior Art

In order to be able to ensure a high measuring accuracy, the drum screw of a sextant must engage into the limbus toothing in axial, radial and tangential directions with a contact pressure that is defined as precisely as possible. An angled leaf spring, supported on the measuring-drum bearing and pressing against the face end of the drum-screw axis was previously employed to achieve the necessary axial component. In addition, the contact pressure or friction of the drum screw against its bearing bush must, however, also be precisely defined.

SUMMARY OF THE INVENTION

The present invention overcomes the preceding shortcomings of the prior art by providing an improvement in a drum screw of a sextant, having a measuring drum mounted on the extended drum screw axis, for fine adjustment of the engagement of the drum screw into the limbus toothing of the sextant. The improvement includes a spring element that surrounds the drum screw axis. The element is arranged to compensate for axial backlash between the measuring drum and the drum screw with low friction and to apply a predetermined amount of contact pressure of the drum screw against the end of a drum screw bearing bush.

The foregoing features of the invention will become further apparent from the detailed description that follows. This description is accompanied by a drawing figure that includes numerals, corresponding to numerals of the written description, which point to the features of the inventor, like numerals referring to like features throughout.

BRIEF DESCRIPTION OF THE DRAWING

The Figure is a cross-sectional view of a drum screw of a sextant with measuring drum mounted on its axis in accordance with the invention.

DETAILED DESCRIPTION

Figure 1:
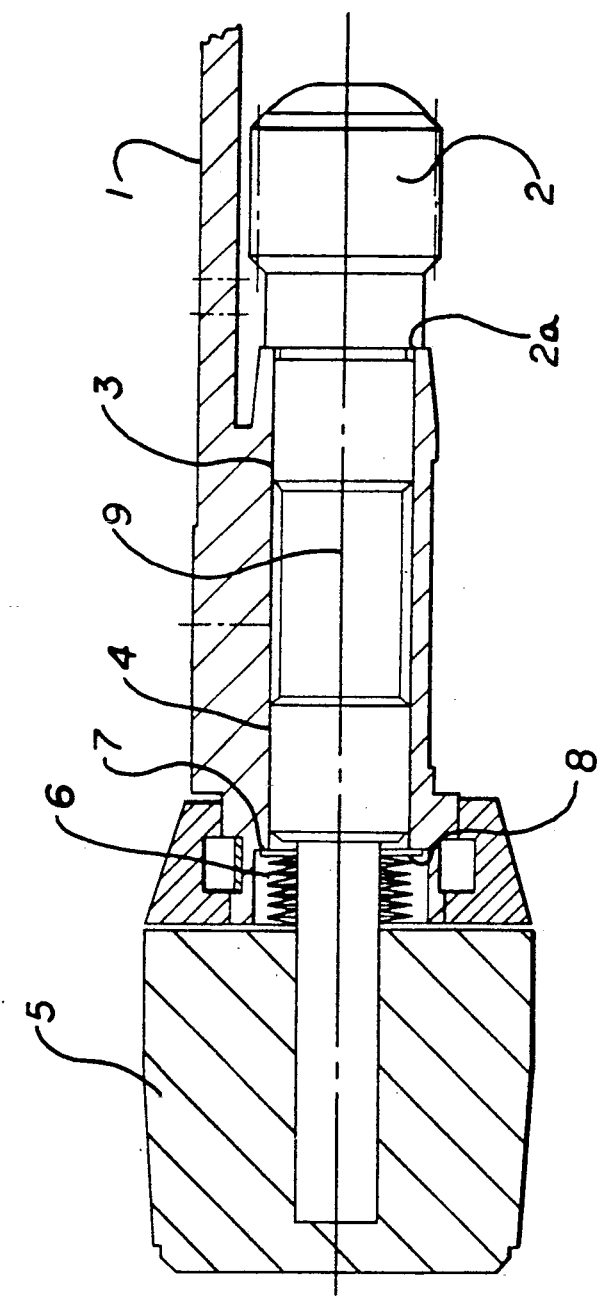

Turning now to the drawings, the Figure illustrates the drum screw of a sextant with measuring drum mounted on its axis in accordance with the invention. A drum-screw bearing plate 1 which is pivotally connected to the sextant alhidade (hot shown) is provided integrally with a bearing, fixed by bearing bushes 3, 4, for a drum screw 2. A measuring drum 5 which includes a scale (not shown) is fitted in a known way onto the extended axis of the drum screw. The bearing at the end facing the measuring drum bush 4 has an outwardly projecting annular shoulder 7 that supports an annular support element 8 of an annular spring assembly 6. The spring assembly 6 surrounds the extended axis of the drum screw 2 and acts, on one side, against the support element 8 and, on the other side, against the end face o the measuring drum 5 that faces the drum screw 2. As a result of the axially acting spring force of the annular spring assembly 6, a desired (defined) amount of contact pressure of the drum screw 2 against the end of the bearing bush 3 is attained while axial backlash of the measuring drum 5, which can now also rotate with very low friction, is avoided. The angled leaf springs of the prior art for contact pressure of the drum screw can be dispensed with. As a result, higher friction values or moments due to obliquely acting angled leaf springs cannot occur.

The functional elements for low-friction operability of the measuring drum 5 and for contact pressure of the drum screw 2 are now completely shifted inwards. As a result it is possible to clean the drum screw or the graduated arc on the limbus of the sextant without affecting the elements that determine measuring accuracy.

While the present invention has been described with reference to its presently preferred embodiment, it is not limited thereto. Rather, this invention is only limited insofar as defined by the following set of claims and includes all equivalents thereof within its scope.

What is claimed is:

1. In a sextant of the type that includes a limbus with toothing, a drum screw, drum screw bearing plate and a measuring drum mounted on an extended drum screw axis, the improvement comprising, in combination:
   a) means for fine adjustment of the engagement of said drum screw into said limbus toothing;
   b) said means comprising a spring element surrounding said axis to compensate for axial backlash between said measuring drum and said drum screw with low friction and insure predetermined contact pressure of said drum against the end of said drum screw bearing plate; and
   c) said spring element comprises an annular spring assembly, said assembly being braced between an annular shoulder of said drum screw bearing plate and said measuring drum.

2. A sextant as defined in claim 1 further including:
   a) an annular planar element; and
   b) said planar element is located intermediate and in direct contact with said annular shoulder and said spring element and coaxial with said drum screw axis.

3. A sextant as defined in claim 2 wherein said spring assembly is locates within an internal annular cavity of said bearing plate.

* * * * *